Figure 1:
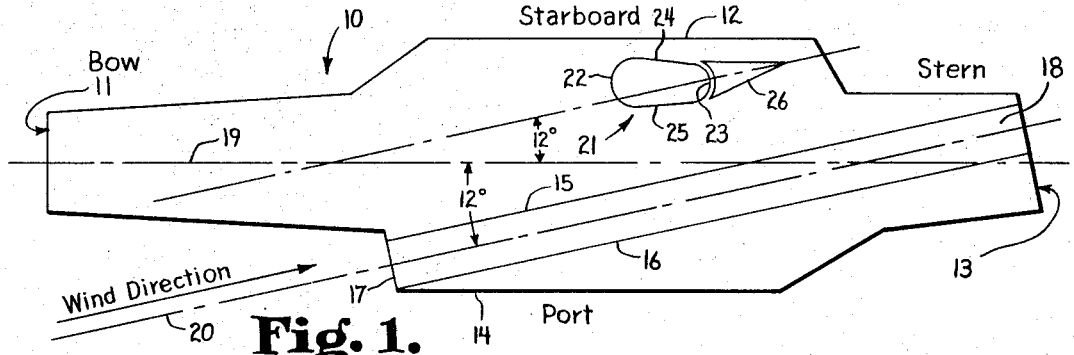

Jan. 9, 1968   F. O. RINGLEB   3,362,368
AIRFLOW CONTROL ARRANGEMENT FOR AIRCRAFT CARRIERS
Filed July 11, 1966

INVENTOR.
FRIEDRICH O. RINGLEB

ATTY'S.

UNITED STATES PATENT OFFICE 3,362,368
Patented Jan. 9, 1968

3,362,368
AIRFLOW CONTROL ARRANGEMENT FOR
AIRCRAFT CARRIERS
Friedrich O. Ringleb, Woodbury Heights, N.J., assignor to the United States of America as represented by the Secretary of the Navy
Filed July 11, 1966, Ser. No. 564,715
5 Claims. (Cl. 114—43.5)

The invention described herein may be manufactured and used by or for the Government of the United States of America for governmental purposes without the payment of any royalties thereon or therefor.

This invention relates to flight deck airflow characteristics of aircraft carriers and more particularly to means for eliminating island air vortex and for minimizing the airflow disturbances caused by the island and ship structure of the aircraft carrier in order to improve the landing characteristics of the aircraft carrier.

Ship designers and builders have never been so much interested in the aerodynamics of the ship's structure above the water line as they have been in the hydrodynamics of the ship's structure below the water line. This is natural since the ship's structure below the water line must be hydrodynamically designed to provide the least resistance of the ship's travel through the water but the ship's speed is not so great that the air resistance of structure above the water line becomes notable. However, in the case of aircraft carriers, while aerodynamic forces of the carrier structure above the water line are negligible as to the ship's operation, the structures on the flight deck, such as the island causing considerable disturbance of the airflow, do become important when they affect the landing of carrier landing aircraft. There are two basic elements which determine the airflow pattern in the environment of an aircraft carrier over the flight deck; namely, the vortex formation when a flow of air passes over a sharp edge, and the vortex associated with the circulation of air around the ship's body under angle of attack with the prevailing airstream (wing tip vortex). The island of an aircraft carrier protrudes above the flight deck level and on known aircraft carriers these islands are of various forms and shapes, usually always containing a great many sharp edges and having large surfaces at various angles to the prevailing airstream. Such structures produce, in general, a strong island air vortex, quite the same as "wing tip vortex," and large air disturbances produced by the many sharp edges in and around the island, all in the wake of the island flowing over the landing area of the flight deck and downstream of the ship in the landing approach path. This strong island vortex or wing tip vortex and the large air disturbances can disturb the aerodynamic flow so much that accidents of aircraft attempting to land are caused by the aircraft hitting the ramp on the flight deck.

In the present invention the aerodynamics of structures on and above the flight deck of an aircraft carrier are changed to eliminate the island vortex or wing tip vortex and to minimize the amount of air disturbance in the environment of the island so that landing aircraft may come onto the ramp smoothly without unusual rotating air currents, updrafts, or downdrafts. The usual island is elongated or slender in the direction of the ship's axis which readily produces the island vortex or wing tip vortex which rotates in one or the other direction around its own core depending on the direction of the angle of attack with the prevailing wind. By this invention the island is positioned relative to the ship's axis to produce, for the whole body of the ship protruding from the water, a zero aerodynamic angle of attack against the prevailing wind for the aircraft landing operation and in this way eliminates the island vortex or wing tip vortex over the landing area. While the island vortex or wing tip vortex can be thus eliminated in the island wake, the air disturbances, caused by a great many air vortices produced by the many sharp edges on and around the island and flowing into the island wake, can be reduced or minimized by streamlining the island structure. Streamlining the island structure is further contemplated in providing good flight deck landing characteristics for aircraft carriers. It is therefore a general object of this invention to control the airflow over an aircraft carrier flight deck to eliminate the island vortex or wing tip vortex of the island and to minimize air disturbance in the wake of the island and in the landing area of the flight deck of the carrier to eliminate the major source of landing accidents.

Figure 2:
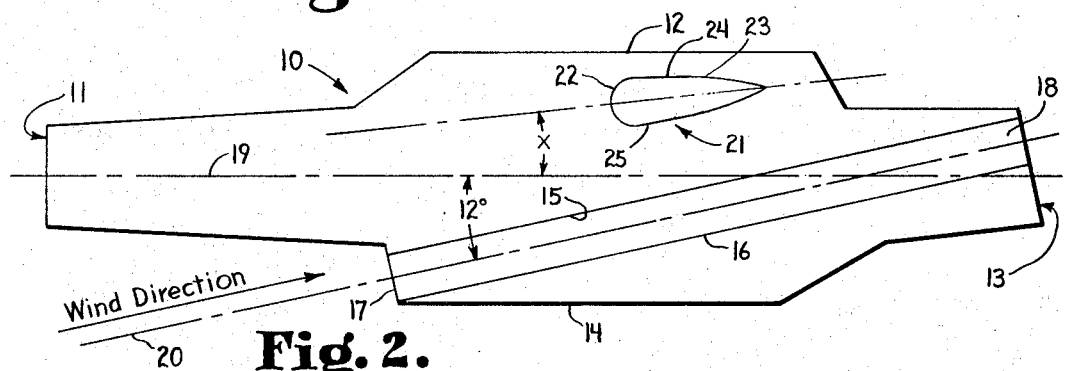
Figure 3:
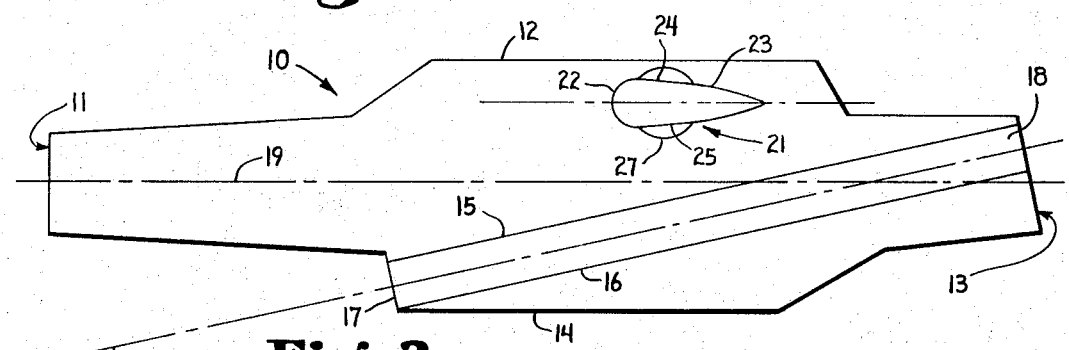
Figure 4:
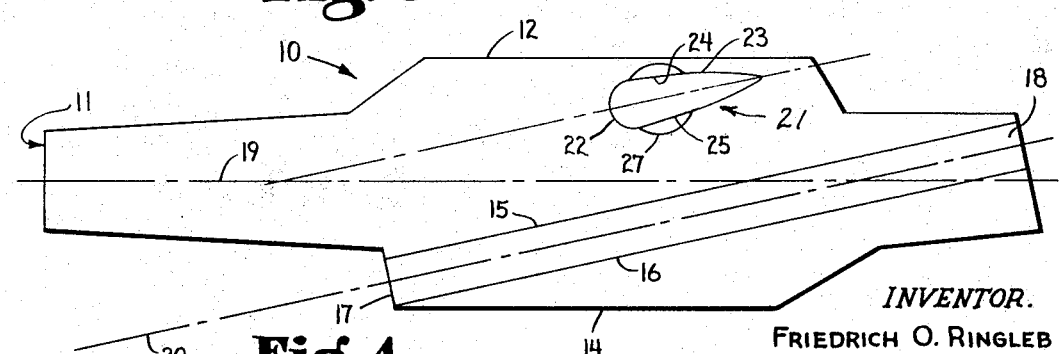

These and other objects and the attendant advantages, features, and uses will become more apparent to those skilled in the art as a more detailed description proceeds taken along with the accompanying drawing, in which:

FIGURE 1 shows a top plan view of an aircraft carrier flight deck with a rudder or flap-type aerodynamic control element behind a fixed streamlined island;

FIGURE 2 shows the top plan view of a carrier flight deck, as shown in FIGURE 1, modified to show an embodiment of a fixed island on the flight deck arranged such that in the usual landing operation of the ship the island air vortex or wing tip vortex caused by the combination of the ship's hull and the island is caused to disappear; and FIGURES 3 and 4 show the top plan view of the flight deck with another embodiment of the island which is angularly controlled on a turntable to a position to produce no wing tip vortex for different wind directions.

Referring more particularly to FIGURE 1, the top plan view of an aircraft carrier flight deck is generally shown by the reference character 10 in which the bow 11 is to the left, the starboard side 12 is at the top, the stern 13 is to the right, and port side 14 is shown on the bottom, as viewed in FIGURE 1. It is a general practice to paint a flight deck landing strip or runway, as shown by the lines 15 and 16 in FIGURE 1, extending from the stern 13 of the ship to a cutout portion 17 near the bow of the ship, recognized as a canted flight deck. The landing strip 15, 16 has a ramp area 18 at which all aircraft touch down on the strip and proceed toward the cutout portion 17. It is well understood that aircraft landing on the ramp area 18 are stopped before going over the side of the ship at 17 by an arresting gear, or other means (not shown). The landing strip 15, 16 is usually placed at an angle of 10 to 12 degrees to the centerline or center plane of the aircraft carrier, as shown by the centerline 19 of the aircraft carrier and the centerline 20 of the landing strip 15, 16. Normally, when the aircraft carrier is prepared to receive landing aircraft, it is usually maneuvered so that the prevailing wind flows in alignment with the landing strip 15, 16, as shown by the wind direction arrow in this figure. The landing aircraft, accordingly, will have the greatest amount of lift by heading into the wind so that aircraft speeds may be sufficiently reduced to land on the air strip, helping the aircraft to be arrested in its travel along the runway.

Every aircraft carrier has an island through which the power plant of the carrier can exhaust smoke or fuel combustible elements by means of a funnel or exhaust pipe and also for supporting stairways, radar antennas, outlook posts or bridge facilities, as well recognized by those skilled in the art. This island structure is illustrated in FIGURE 1 by the reference character 21. This island is preferably, in accordance with this invention, an elongated structure having a leading or forward edge or end 22 rounded and the trailing edge or portion 23 as shown, both ends being connected by smooth, straight, or slightly convex surfaces 24 and 25. It is also to be understood that the top of the island 21 is likewise constructed in a smooth convex curve portion meeting the rounded portions 22–25. The longitudinal centerline of the island structure 21 parallels the longitudinal centerline or center plane 19 of the carrier. This is approximately the best aerodynamic position for the island when the aircraft carrier travels into the wind or in a still air in which case the airflow is primarily in alignment with the centerline 19 of the carrier. However, when the carrier maneuvers to bring wind direction in alignment with the centerline 20 of the runway 15, 16, the island 21 will have an angle of attack with respect to the wind causing an island wing tip vortex extending from the island over the stern and landing area of the aircraft carrier. To eliminate this vortex of air a rudder-like member or flap 26 is adjustably pivoted at the end of the main body 23 of the island to produce a smooth airflow over and around the island 21 and the flap 26. When the ship is proceeding on its plotted course at various angles of wind direction, the flap 26 is kept in alignment with the longitudinal axis of the island 21 but, when the carrier is maneuvered to direct wind in alignment down the runway 15, 16, the flap 26 is rotated so that the predetermined aerodynamic angle of attack becomes zero. Then the island wing tip vortex is eliminated and the air disturbance in the wake of the island is minimized. Landing aircraft are then much less apt to encounter rotating air currents, rising air currents, or downdrafts which would alter their glide path and landing on the runway.

Referring more particularly to FIGURE 2, where like reference characters are applied to like parts in FIGURE 1, the island 21 is fixed in a position with the longitudinal centerline thereof at some predetermined angle $x$ with respect to the longitudinal centerline or center plane 19 of the carrier. This angle $x$ is predetermined in wind tunnel or smoke tunnel experiments of a model ship to obtain the best aerodynamic position for the island in the operation of that ship, considering the aircraft landing mode and the mode of normal forward travel with various wind directions. The aircraft carrier above the water line, and particularly the edges of the flight deck, together with the island structure produce airflow disturbances over the flight deck. The angle $x$ can be made such that the air disturbances of the flight deck can be compensated and the island wing tip vortex eliminated for the aircraft landing mode when the airstream is in alignment with the runway centerline 20, as shown by the wind direction arrow. It may be realized that the angle $x$ probably will be within the limits of 0° to 12°. The model of one aircraft carrier fixed the optimum position of the island at 4°, for example; however, it should be understood that the angle $x$ will be different from each aircraft carrier, depending on the structural configuration of the hull above the water line, the flight deck, and the island. It is a purpose of this invention to reduce the island wing tip vortex to zero for the landing mode of carrier aircraft by the proper angular positioning of the island.

Referring more particularly to FIGURES 3 and 4, where like reference characters are applied as in FIGURES 1 and 2, the island structure 21 is fixed on a turntable 27 in the floor of the flight deck which is adjustable over a few degrees, such as over about 15° right and left of a centerline parallel to the centerline 19 to adjust the island for the normal sailing mode or for aircraft landing maneuvers with various wind directions. The turntable 27 may be powered by any well known means such as by hydraulic motors, electric motors, or the like, to rotate the turntable 27 clockwise or counterclockwise over this 30° arc for adjusting the island 21 for its optimum aerodynamic position of zero angle of attack. Rotation of the complete island structure can be readily accomplished since the exhaust system of the power plant for the ship can be centrally located in the island structure and the island structure rotated around this funnel or exhaust stack. The stairway in the island can be made to have the lower step slide on or just clear the lower deck without causing any interference. Other structures on the island such as the radar antenna, electric cables, bridge and other parts, will be substantially unaffected by the slight rotation of the island. As in the modification in FIGURE 2 the zero angle of attack position of the island 21 for various prevailing wind directions over the deck must be determined from like models in wind or smoke tunnels. Once these island positions are established, instrumentation can be installed in the appropriate carrier to permit operating personnel to maintain the island 21 position where no island wind tip vortex is formed during the landing mode of the carrier aircraft although the carrier is unable to maneuver for the prevailing wind direction to parallel the runway centerline. Thus, the zero angle of attack of the island 21 to eliminate the island wing tip vortex, tending to be produced by the ship's hull and island, prepares the flight deck for the landing mode without the danger of a vortex of air passing through the guide path of the landing aircraft to cause them to go out of control.

*Operation*

In the operation of the embodiments of the invention shown in FIGURES 1 through 4 let it be assumed that the modification in FIGURE 1 is first considered. In this modification it is preferable to maneuver the carrier to bring the prevailing wind direction into alignment with the runway 15, 16 for the landing mode. The flap or rudder-like member 26 is adjusted at an angle approaching the direction of the airstream until the island wing tip vortex is eliminated. This flap angle can be found by smoke tunnel or wind tunnel tests of a model and the adjustment equipment calibrated for this angle as well as other angles for different wind directions close to the runway angle. If the island is not streamlined, as shown in FIGURE 1, the wake of the island 21 will be devoid of any vortex but will have air disturbance proportional to the surface irregularities of the island 21. The absence of the air vortex removes the greatest danger to landing aircraft. If the island 21 is streamlined, the air disturbance in the wake of the island will be minimized and still further improve the landing characteristics of the flight deck.

In the modification of FIGURE 2 the elongated or slender island 21, whether streamlined or not, is angularly positioned on the flight deck in accordance with the results of smoke tunnel or wind tunnel experiments to completely eliminate the island wing tip vortex for the landing mode. This provides a substantially smooth airstream over the runway ramp and landing approach which can only be improved by streamlining the island to reduce air disturbance in the island wake to a minimum.

In the modification of FIGURES 3 and 4, the position of the turntable 27 to position the island 21 is adjusted by instruments calibrated from smoke tunnel and wind tunnel tests to completely eliminate island wing tip vortex in the island wake for the prevailing wind direction. In this modification, while it is preferable to maneuver the carrier to bring the prevailing wind in alignment with the runway 15, 16 so that the landing aircraft can land into the wind, this may not be possible in wartime maneuvers. Thus, the calibrated adjustment of the turntable 27 may be used, where necessary, to eliminate the dangerous island wing tip vortex although higher speed landings will be required. Here again, good streamlining characteristics of the island provide better airflow characteristics in the island wake by reducing the air disturbance caused by the island surface structure.

By the means of this invention the vortex of air, produced by the usual elongated or slender island together with structure of the ship's hull above the water line, normally existent in the wake of the island and flowing over the landing area of the carrier, is completely eliminated. Further, streamlining of the island greatly reduces air disturbance in the wake of the island to provide a substantially smooth flow of air following the airstream in the landing approach area behind the carrier and over the landing ramp to eliminate the principal cause of landing aircraft accidents.

While many modifications and changes may be made in the constructional details and features of this invention in view of the teaching of the three embodiments herein to accomplish like or similar results and functions, I desire to be limited in the spirit of my invention only by the scope of the appended claims.

I claim:

1. An island airflow control for aircraft carriers having a canted flight deck with an aircraft landing ramp and runway along the flight deck from the stern toward the bow at an angle to the longitudinal centerline of the carrier comprising:

an elongated island on one side of the flight deck; and means associated with said island to position same for reducing the aerodynamic angle of attack thereof with the airstream to zero when the carrier is operating in the landing mode whereby the air vortex normally produced by the island is eliminated and the air disturbance produced by the ship and island structure is minimized in the wake of the island over the flight path and the landing ramp area.

2. An island airflow control as set forth in claim 1 wherein said means associated with said elongated island includes fixedly supporting the island in the flight deck to eliminate all island wing tip vortex when the prevailing airstream is parallel to said runway.

3. An island airflow control as set forth in claim 1 wherein said means associated with said island includes a rudder-like flap coextensive in height with said island and rotatably adjustable about the trailing edge of the island to a position in which the air vortex produced by said island is eliminated in the island wake.

4. An island airflow control as set forth in claim 1 wherein said means associated with said elongated island includes a turntable at flight deck level supporting said island, said turntable being adjustable to position said island for aerodynamic zero angle of attack to eliminate the air vortex from the island wake.

5. An island airflow control as set forth in claim 1 wherein said island is streamlined with the leading nose end thereof predominately round and the sides of the elongated portion terminating in a predominately sharp trailing end to minimize airstream disturbance.

References Cited

UNITED STATES PATENTS 2,331,112   10/1943   Durgin _____ 114—43.5

ANDREW H. FARRELL, *Primary Examiner.*